(No Model.)
C. H. DAVIDS.
DRIVE CHAIN.
No. 538,222. Patented Apr. 23, 1895.
Fig. 1.
Fig. 2.
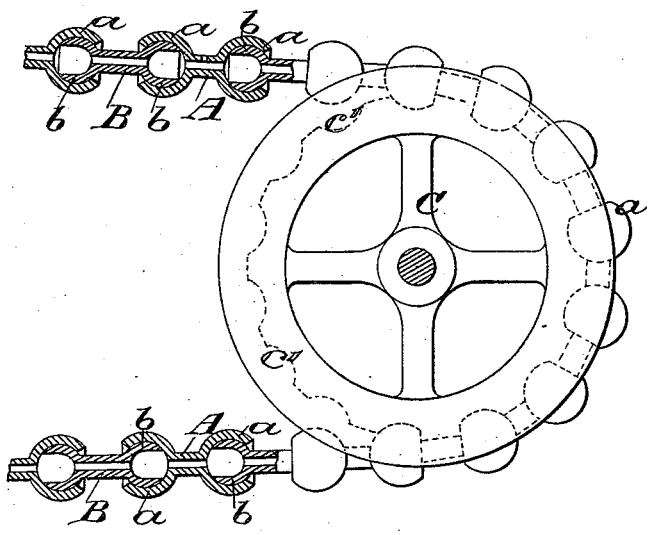
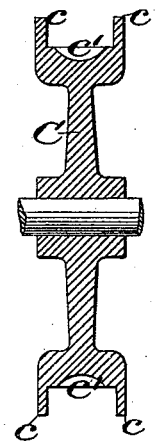
Fig. 3.
Fig. 4.
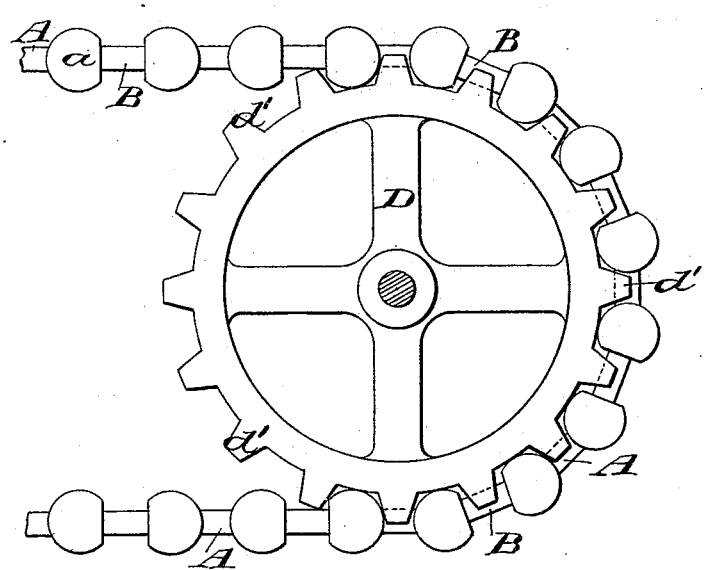
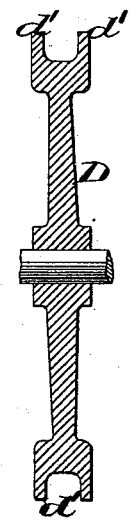
Witnesses:— George Barry.
Inventor:— Charles H. Davids by attorneys Brown & Seward

UNITED STATES PATENT OFFICE.

CHARLES H. DAVIDS, OF BROOKLYN, NEW YORK.

DRIVE-CHAIN.

SPECIFICATION forming part of Letters Patent No. 538,222, dated April 23, 1895.

Application filed August 25, 1894. Serial No. 521,280. (No model.)

*To all whom it may concern:*

Be it known that I, CHARLES H. DAVIDS, of Brooklyn, in the county of Kings and State of New York, have invented a new and useful Improvement in Drive-Chains, of which the following is a specification.

My invention relates to an improvement in drive chains in which provision is made for distributing the oil to the chain joints throughout the interior of the chain, the links being coupled by ball and socket joints.

A practical embodiment of my invention is represented in the accompanying drawings, in which—

Figure 1 is a view in side elevation partly in section showing the chain engaged with a sprocket wheel provided on its periphery with sockets for the reception of the outer member of the ball and socket joint. Fig. 2 is a central transverse section through the sprocket wheel. Fig. 3 is a view in side elevation of a portion of the chain and sprocket wheel, in which the sprocket wheel engages the opposite sides of the stem of the link intermediate of the joints; and Fig. 4 is a view in transverse, central section of the modified form of sprocket wheel.

The links which form the chain are of two styles which I shall term—for convenience—the inner and outer links. In the formation of the chain, the inner links alternate with the outer links, the structure and arrangement being more particularly as follows:—

The outer links are denoted by A and the inner links by B. They have the same general characteristics, each consisting of a tubular stem provided with globular or cup-shaped ends, the cup-shaped ends of the outer links being denoted by $a$ and the cup-shaped ends of the inner links being denoted by $b$. It is intended that the interior of the cup-shaped end $a$ of the outer link shall embrace with a close sliding fit the cup-shaped end $b$ of the inner link and that the end $a$ of the outer link shall embrace a sufficient portion of the end $b$ of the inner link to prevent the separation of the two after the links have been assembled. At present, the links are assembled by compressing the cup-shaped end of the outer link around the cup-shaped end of the inner link, after the latter has been inserted therein. The space within the tubular stems of the links communicates with the interior of the assembled cup-shaped ends, so that when the links are assembled, there is a continuous open channel throughout the length of the chain.

For purposes of keeping the chain lubricated, I may fill the interior of the chain with some lubricating oil which may distribute itself at will throughout the interior of the chain, or the interior of the chain may be provided with a string of some suitable material, such for example as candle wick, for the purpose of extending the |lubricating oil by capillary direction throughout the chain.

In practice, the chain may be driven by a sprocket wheel such as shown in Fig. 2, where the wheel—denoted by C—is provided on its periphery intermediate of the side rims $c$, with depressions $c'$ at suitable intervals to receive the ball joints of the chain, or the chain may be made to transmit power by engaging a sprocket wheel of the type shown in Figs. 3 and 4, where the periphery of the wheel D is provided at intervals with teeth $d'$, spaced apart to receive between them the tubular stems of the links, the distance between successive pairs of teeth being sufficient to admit between them the ball joints of the chain.

This chain is particularly well adapted for use in connection with the sprocket wheels commonly employed for transmitting power from the pedals of a bicycle to the traction wheel, but it is not limited to this particular use, as it may be employed in general wherever it is desirable to employ sprocket chains which shall be light and strong.

What I claim is—

1. A sprocket chain, consisting of links having hollow stems and connected at their ends by ball and socket joints, substantially as set forth.

2. A chain, consisting of links having hollow stems and cup or globular-shaped ends, the globular-shaped end of one link being adapted to loosely embrace the globular-shaped end of the adjacent link for locking the links together, substantially as set forth.

CHAS. H. DAVIDS.

Witnesses:
 FREDK. HAYNES,
 GEORGE BARRY.